Feb. 5, 1935.  H. A. COVILL  1,989,667
CUTTER FOR FORMING TWIST DRILLS
Filed March 7, 1932
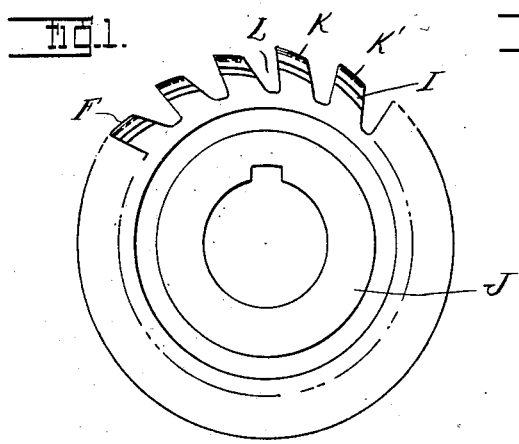
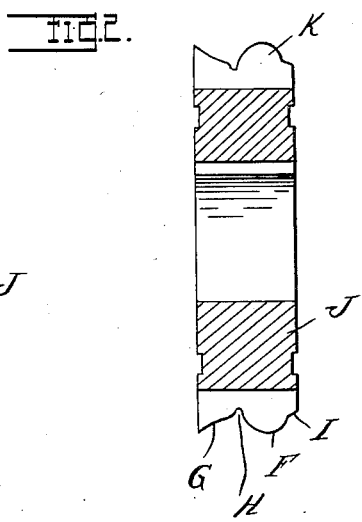
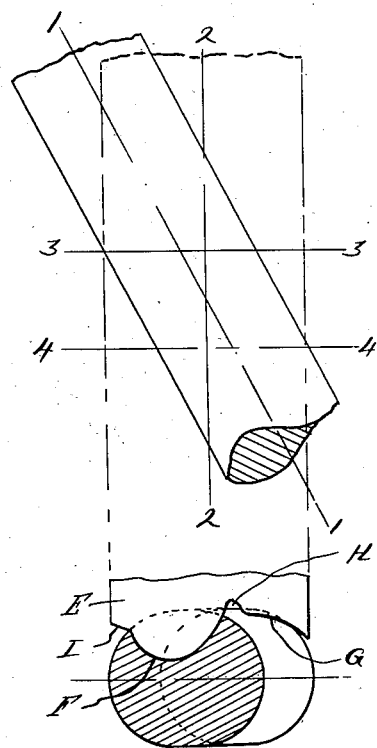
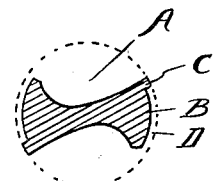
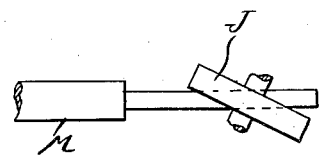
Inventor
Harry A. Covill Patented Feb. 5, 1935

1,989,667

UNITED STATES PATENT OFFICE 1,989,667

CUTTER FOR FORMING TWIST DRILLS

Harry A. Covill, Royal Oak, Mich., assignor to National Twist Drill and Tool Company, Detroit, Mich., a corporation of Michigan Application March 7, 1932, Serial No. 597,397

2 Claims. (Cl. 29—103)

The invention relates to the manufacture of twist drills and it is the object of the invention to simplify and expedite the operations. In the present state of the art it is usual to perform three distinct operations in fashioning the drill. The first operation is the cutting of the spiral groove or flute therein. A second operation is the cutting away of the rear portion of the peripheral face intermediate the flutes to provide clearance. The third operation is the removing of the burr formed by the fluting operation on the rear face of the portion intermediate the flutes. These three operations are performed either in distinct machines or in some cases such as turret machines, they are performed by distinct tools acting successively on the same blank. The reason for this will be apparent when it is considered that the drill blank is a cylinder and the milling cutters employed have their teeth traveling through a circular orbit. It is therefore geometrically difficult or impossible to fashion a single tooth so that in rotating about the axis of the cutter it will simultaneously perform these several functions on the different portions of the cylindrical blank. I have, however, solved the problem through the design of a cutter which while having a series of like fashioned teeth operates with different portions of the same successively. The invention therefore consists in the method and construction as hereinafter set forth.

In the drawing:

Figure 1 is a side elevation of the cutter;

Figure 2 is a cross section thereof;

Figure 3 is a cross section through a drill showing in dotted lines the blank from which it is formed;

Figure 4 is a diagram illustrating the principle of operation of my improved cutter.

Figure 5 is a plan view of the machine.

As illustrated in Figure 3, a twist drill is provided with a plurality of helical grooves A with intermediate segments B which latter are cut away in rear of the advance edge C to provide a clearance indicated at D. In the cutting of the helical grooves A the plane of rotation of the cutter is oblique to the axis of the blank to produce the desired helical angle, and consequently it would be impossible to simultaneously fashion the portions A and D by a single cutting edge. For this reason it has been the practice in the past to perform these operations successively with different tools.

The principle of operation of my improved cutter is illustrated in the diagram, Figure 4, which represents an oblique cross section through the grooved blank and in projection therewith a diagrammatic plan of the cutter and the blank. The cutter E has a portion F fashioned to form the groove A and continuous with this portion F a second portion G which, in the position shown, is out of contact with the blank. However, if the blank is advanced along the axis 1—1 which is oblique to the plane 2—2 of the cutter and is simultaneously revolved, the portion G will be brought into operative relation to the segment B and will cut the clearance D. Thus a cross section on the line 3—3 shows the portion F of the cutter in engagement with the groove which is formed thereby while a cross section on the line 4—4 shows a portion G in operative relation to the blank to form the clearance D while the portion F is out of contact with the blank.

Based on the principle just described, I have devised a construction of cutter which may be in the form of an ordinary milling cutter gashed to form successive teeth, each of which has a portion F and a portion G with an intermediate groove H and an oblique portion I at the left side of the portion F. Such a cutter when properly set in relation to a rotating and axially advancing blank will simultaneously cut the groove A and the clearance D with successive teeth thereof operating on longitudinally spaced portions of the blank. Therefore with a single operation both of these two portions of the blank are properly fashioned.

As illustrated in Figures 1, 2 and 5, J is the rotary milling cutter having a series of teeth K K' formed by transverse gashes L. Each of the teeth is fashioned with a portion F for forming the groove or flute, a portion G for cutting the clearance in the peripheral portion intermediate the grooves H and the burr removing portion I. The blank is mounted in a suitable work holder M which has imparted thereto by mechanism (not shown) a simultaneous rotary movement and axial advancement along the line 1—1 of Figure 4. The cutter J is mounted to rotate in a plane at an angle to the axis of the work corresponding substantially to the helical angle of advancement of the blank. Thus when the cutter is fed into the blank the portions G and F of the same tooth are never in simultaneous operation but these portions G and F of different teeth are operating simultaneously. The portion G is operating on a longitudinally advancing portion of the blank indicated by the line 4—4 at the same time the portion F is operating upon another portion of the blank along the line 3—3. The groove H between the portions G and I will leave a portion adjacent to the edge C of the original diameter of the blank while the portion I will remove the burr which would otherwise be formed between the portions D and A.

What I claim as my invention is:

1. A rotary cutter for forming twist drills comprising a circular series of like teeth, each having a projecting groove cutting portion, a narrow recess adjacent to one side thereof for clearing the work and a clearance cutting portion extending laterally from said recess.

2. A rotary cutter for forming twist drills comprising a circular series of like teeth, each having a projecting groove cutting portion, a narrow recess adjacent one side thereof for clearing the work, a clearance cutting portion extending laterally from said recess, and a chamfering portion adjacent the other side of said groove cutting portion.

HARRY A. COVILL.